United States Patent [19]

St. Clair et al.

[11] 4,281,102
[45] Jul. 28, 1981

[54] TACKIFIER FOR ADDITION POLYIMIDES CONTAINING MONOETHYLPHTHALATE

[76] Inventors: Robert A. Frosch, Administrator of the National Aeronautics and Space Administration, with respect to an invention of Terry L. St. Clair, Poquoson; John M. Butler, Roanoke, both of Va.

[21] Appl. No.: 92,141

[22] Filed: Nov. 7, 1979

[51] Int. Cl.³ ..................... C08G 12/00; C08G 16/00; C08G 73/10
[52] U.S. Cl. .................................... 528/229; 264/137; 428/473.5; 528/222
[58] Field of Search ................................ 528/229, 222

[56] References Cited

U.S. PATENT DOCUMENTS 3,803,081  4/1974  Lubowitz ............................ 528/229
4,070,312  1/1978  Galiani ............................... 528/229
4,166,170  8/1979  St. Clair ............................. 528/229

*Primary Examiner*—Howard E. Schain
*Attorney, Agent, or Firm*—Howard J. Osborn; John R. Manning; Wallace J. Nelson

[57] ABSTRACT

An improvement of addition polyimides wherein an essentially solventless, high viscosity laminating resin is synthesized from low-cost liquid monomers. The improved process takes advantage of a reactive, liquid plasticizer such as monoethylphthalate (MEP) which is used in lieu of an alcohol solvent, and helps solve a major problem of maintaining good prepreg tack and drape, or the ability of the prepreg to adhere to adjacent plies and conform to a desired shape during the layup process. This improvement results in both longer life of the polymer prepreg and the processing of low-void laminates and appears to be applicable to all addition polyimide systems.

5 Claims, 1 Drawing Figure

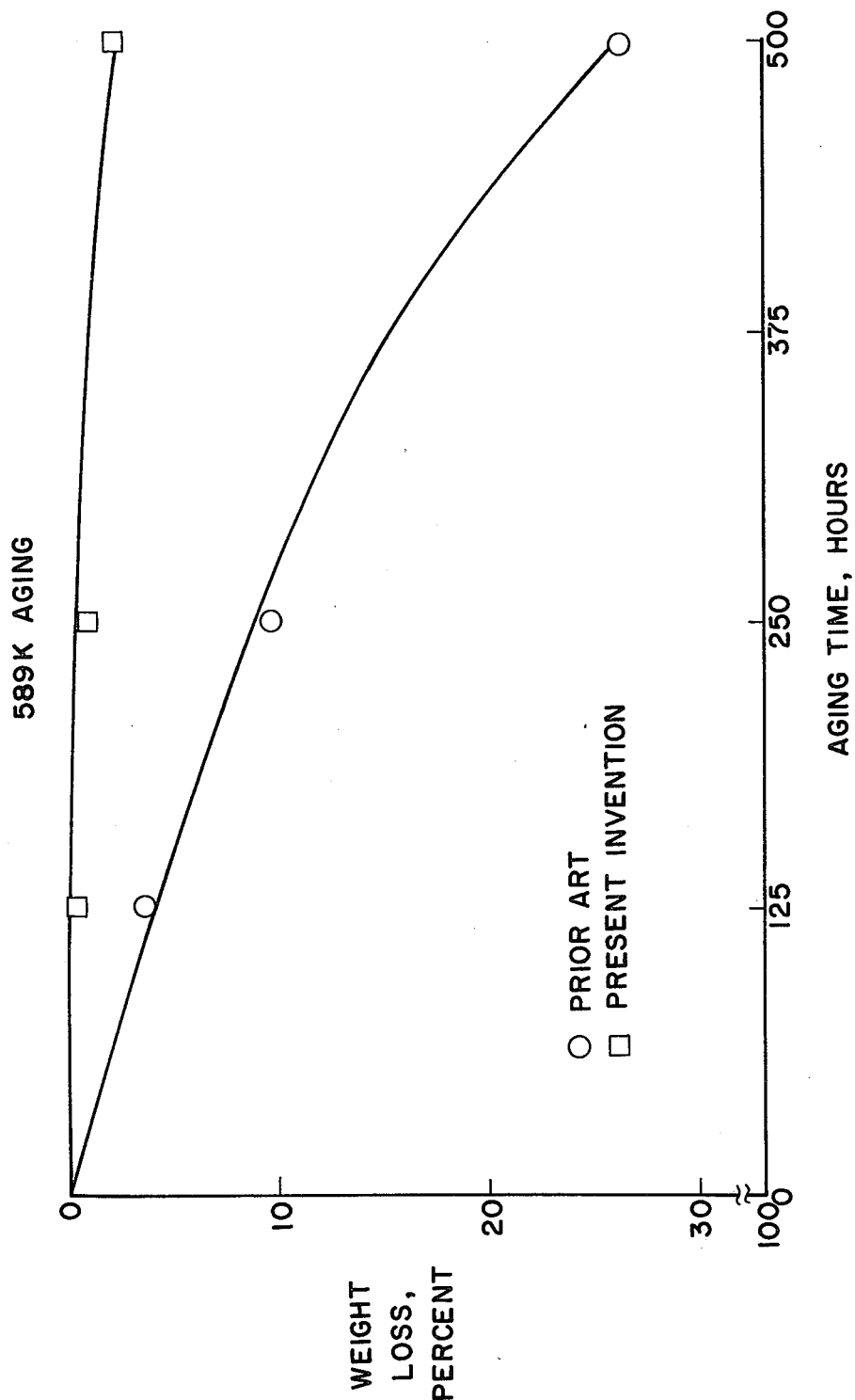

TACKIFIER FOR ADDITION POLYIMIDES CONTAINING MONOETHYLPHTHALATE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; USC 2457).

BACKGROUND OF THE INVENTION

The present invention relates to improved polyimide composites and methods of utilizing same for composite structural application. Specifically, the present invention is an improvement in that disclosed in U.S. Pat. No. 4,166,170 issued Aug. 28, 1979 and incorporated herein by reference.

Most addition type polyimide systems suffer from being a dry, powdery solid at room temperature. This requires these systems be dissolved in a solvent before they can be applied to glass or graphite to form an impregnated fiber or fabric called "prepreg" (pre-impregnated). Once the polyimide resin system has been made into prepreg, some of the solvent has to be retained in order to cause these sheets of prepreg to stick together and be flexible enough to work into complex shapes, for example, the fabrication of structural components for aircraft. If this solvent is lost due to volatility the result is a dry and brittle prepreg that is nearly impossible to work. The use of a solvent for this application, however, leads to another major problem—the removal of this liquid before the component is subjected to a 500°–700° F. cure (the reactive end groups cure through a vinyl-type polymerization at these temperatures). If all of the solvent is not removed, it will create void-areas in the cured part. These void-areas always cause the strengths of the resulting parts to be low.

All of the solvents that have been used with addition-type polyimides in the past are of the type that generate these volatiles during the cure of the resin. In the present invention, an approach is presented which eliminates this solvent problem.

It is therefore an object of the present invention to provide an addition type polyimide having improved physical property characteristics of tack and drape, i.e., the ability to stick and conform to complex shapes.

An additional object of the present invention is to provide an addition type polyimide resin system for providing laminates having excellent strength retention and improved thermooxidative stability.

A further object of the present invention is to provide an inexpensive polyimide resin system that is easy to fabricate and uses a high boiling point reacting solvent.

Another object of the present invention is a process for increasing the shelf life of an improved prepreg for use in fabricating composite structures.

Another object of the present invention is a novel process of preparing prepreg having enhanced tackiness property characteristics for use in fabricating composite structures.

BRIEF SUMMARY OF THE INVENTION

According to the present invention, the foregoing and other objects are attained by utilizing a liquid ester acid as the reactive solvent in lieu of an alcohol solvent employed in previous systems. The use of reactive solvents, i.e., solvents that are actually reacted into the final cured polymer system without the generation of harmful volatiles, is one solution to minimize the problem of dry and brittle prepregs. For addition polyimides two general classes of reactive solvents that can be used are the amines and esters. The use of liquid amines, or amine mixtures is described in U.S. Pat. No. 4,166,170, wherein a eutectic mixture of aromatic amines was used to create a liquid addition polyimide system. The other approach, the use of reactive liquid esters, is the subject of the present invention. An example of a monomeric mixture of amines and esters which can be converted to an addition polyimide system is as follows:

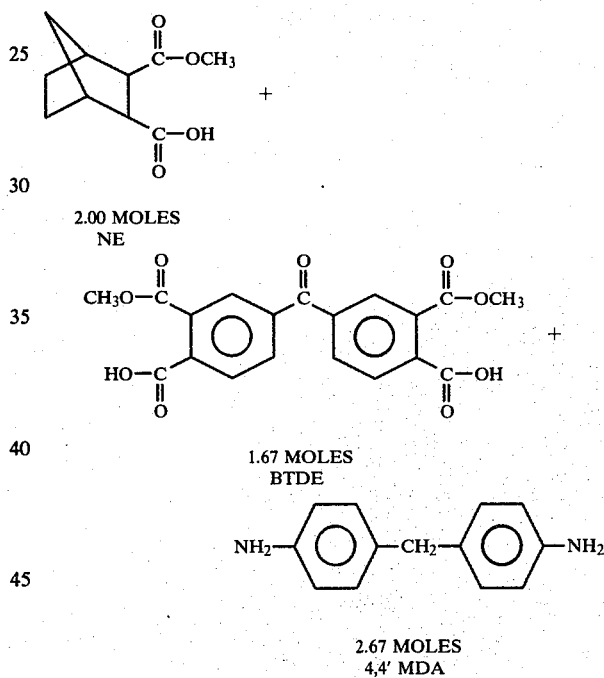

These three materials when properly staged to 300°–400° F. and then subsequently cured or cross-linked at 600° F. form a system of the following structure:

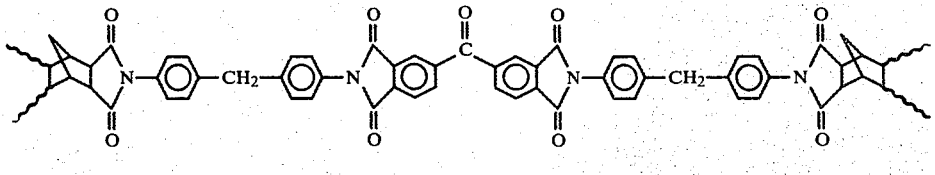

The improvement on this state-of-the-art system developed by the present invention is the use of a liquid ester acid such as monoethylphthalate (MEP) as a reactive solvent to replace the alcohol solvent that must be used with the system in the prior art.

Monoethylphthalate (MEP) is represented by the formula:

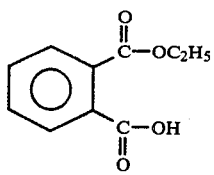

Physically, monoethylphthalate (MEP) has a melting point of −2° C., but does not boil (reverts to phthalic anhydride), and a density of 1.1877 g/ml at 22° C.

As indicated in the physical properties, MEP is a liquid above −2° C. and it does not boil. An added advantage to this material is that it has a very low vapor pressure at temperatures where it would be used in normal fabrication operations such as laying-up of prepreg in a shop area. This low vapor pressure allows essentially all of the MEP to be retained, and thereby, tack and flexibility of the prepreg to be retained. When the state-of-the-art system utilizing alcohols is used, these solvents are so volatile at room temperature they are rapidly lost to the atmosphere leaving a brittle and dry prepreg which is difficult if not impossible to work with. The use of high boiling alcohols such as n-butyl alcohol has been tried, but these solvents cannot be removed during processing, and therefore, lead to cracked and/or voidy composite parts.

The MEP is normally used in place of 3–20 percent (five percent preferred) of the benzophenonetetracarboxylic diester diacid (BTDE). Hence a nominal formulation for a liquid system using the previous example would be 2.00 moles 5-Norbornene-2,3-dicarboxylic ester acid (NE); 1.50 moles BTDE; 0.34 moles MEP; and 2.67 moles 4,4′-methylenedianiline (MDA).

Other reactive tackifiers of the ester-acid type that may be employed in lieu of the MEP are

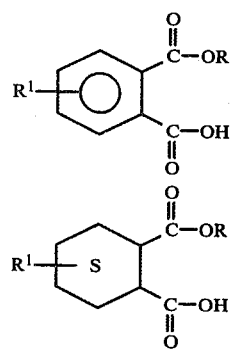

where R and/or R¹ can be=—H, —CH₃, —CH₂CH₃, —CH₂CH₂CH₃, —CH(CH₃)₂, —CH₂CH(CH₃)₂, —C₆H₅.

A system that was investigated quite extensively was the one based on an eutectic amine mixture, BTDE and NE. This material was developed by NASA and is outlined in U.S. Pat. No. 4,166,170. The eutectic amine mixture has the general structure

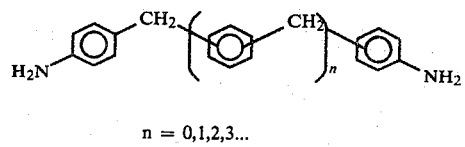

n = 0,1,2,3...

These amine mixtures are generally referred to as polymethyleneanilines. The primary component in the mixtures is where n=o (usually 40%–80%). This polyimide resin as described in U.S. Pat. No. 4,166,170, is commercially available from several companies (Hexcel, Inc., Riggs Engineering and U.S. Polymeric, Inc.) and manufactured under license from NASA.

When this patented product was formulated with 10 percent of the BTDE replaced with MEP, the resulting resin system remained liquid for up to six months as compared to two days for the base patented formulation.

DETAILED DESCRIPTION OF THE INVENTION

A more complete appreciation of the invention and many of the attendant advantages thereof will be better understood when considered by reference to the following specific examples.

The monomers employed in each of the following examples were 3,3′,4,4′-Benzophenone tetracarboxylic acid dianhydride (BTDA), 5-Norbornene-2,3-dicarboxylic anhydride (nadic anhydride or NA), and phthalic anhydride, each obtained commercially and used as received. The diamine used in each Example was Jeffamine AP-22, and obtained commercially from Jefferson Chemical Company, Inc., Houston, Texas.

EXAMPLE I 1.10 Moles NE (an ethyl ester of norbornene dicarboxylic acid anhydride); 0.67 moles BTDE; 0.12 moles MEP; and 2.56 molar equivalents of an amine mixture. The mixture of amines (Jeffamine AP-22) is composed of isomers of methylenedianilines (MDA) in essentially the following percentages:

o,o′-MDA-3.20%
o,p′-MDA-15.70%
p,p′-MDA-66.00%

Also included in the amine mixture are the tri and tetra-functional amines

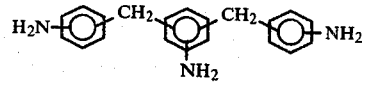

4.50% all isomers, and

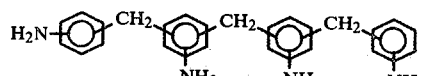

10.60% all isomers.

Not only did this use of MEP cause a solid addition polyimide system to be liquid, it also caused a liquid system which tends to become glassy after two days to remain liquid for four to six months. The use of MEP in the basic formulation also yielded a resin which had a greater degree of tackiness than that disclosed in U.S.

Pat. No. 4,166,170. The resulting prepregnated fibers also exhibited this enhanced tackiness and remains workable for up to six months after being prepared.

The amine mixture remains liquid because the large number of isomers, all of which are solid at room temperature, tend to retard crystallization because of the high degree of disorder, or large entropy factor, which makes it difficult for nucleation and subsequent crystallization to occur. This liquid mixture is further stabilized in the liquid state when mixed with the ester mixture and remains workable or usable for approximately six months.

This mixture of monomers which can then be used without a carrier solvent for prepregging onto fibers allows for the formation of a tacky (or sticky) and drapeable, i.e., easy to contour, prepreg which is highly desirable for composite or laminate fabrication in that complex shapes are easier to fabricate.

Other amine mixtures and amine-ester mixtures may also be adapted to the present invention to form liquid laminating resins (such as for example, acetylene endcap polyimides and the like) that are useful for "hot melt" prepregging onto fibers.

EXAMPLE II

Stoichrometric amounts of diethylester, of BTDA (BTDE) 0.67 mole, and the monoethylester of Nadic Anhydride, (NE), 1.10 mole and the monoethylester of Phthalic Anhydride (PE), 0.12 mole were prepared by refluxing the corresponding anhydrides with an excess of ethanol (2.69 mole). The stoichrometric amount of ethanol needed for the NE+BTDA used is 2.57 moles. Thus, an excess of 0.12 moles is employed to ensure complete or near complete conversion. Since this type of reaction is an esterification, which always requires an excess of alcohol, the alcohol is not there as a solvent. The esterification reaction was for one hour at reflux (approximately 351.4K.) and was carried out in a three neck round bottom flask equipped with a mechanical stirring device. When all of the monomers had gone into solution, the refluxing was continued for one-half hour longer. The solution was allowed to cool to 310K.-320K. and then mixed with Jeffamine AP-22, 2.56 molar equivalents of amine, which had previously been warmed to 310K.-320K.

The solution was cooled, bottled and refrigerated, since the ester-acids tend to disproportionate on standing; the refrigeration helps extend the solution stability.

The original final version of LARC-160 (U.S. Pat. No. 4,166,170) contained BTDE (0.67 mole), NE (1.22 mole), Ethanol (0.12 mole) and Jeffamine AP-22 (2.56 mole). The process for preparation was the same as previously described. The amount of ethanol and Jeffamine AP-22 remained the same in the present invention as that described in U.S. Pat. No. 4,166,170 (2.57 moles of the ethanol was consumed in preparing the NE+BTDE esterfication). In each case, the mixtures stayed liquid and did not turn granular after the solvent was evaporated.

EXAMPLE III

A resin prepared as in Example II was added at a ratio of 50 percent solids by weight in ethanol. The ethanol is used as a carrier and is allowed to evaporate. The ethanol carried resin was brushed onto Hercules HT-S graphite fiber, which had been drum wound at a spacing of 5½ tows per inch. The resulting prepreg had a 50 percent fiber content by weight. The ethanol content was reduced to about 10 percent by allowing it to evaporate for 8-16 hours after being coated. The resulting prepreg having good tack and drape was then removed from the drum and could be easily cut and formed into shaped layups.

EXAMPLE IV

The prepreg described in Example III was cut into 7.6 cm by 17.8 cm (3 in. by 7 in.) laminae and stacked into 17-ply unidirectional preforms. The preformed billet was subjected to the first stage in the curing process. This required the preform to be vacuum bagged at 7-14 kPa, guage (2.4 in, Hg, guage). The billet was then heated from ambient at a rate of 2.8K. (5° F.) per minute to 436K. (325° F.) and held at that temperature for one hour, then cooled under vacuum to room temperature. This step is known as the consolidation and imidization step, which results in about a 25 percent weight loss and a well-formed billet averaging 36 percent resin by weight.

EXAMPLE V

The molding procedure was accomplished by using a flat matched-metal mold which had open ends. The consolidated billet of Example IV was trimmed to fit the mold with the 0° fiber in the direction of the open ends, thus allowing observation of the resin flow during molding. The platens of the press were preheated to 478K. (400° F.) before the mold containing the billet was introduced, and contact pressure was applied. A heating rate was then established at 2.8K. (5° F.) per minute. When a temperature of 547K. (525° F.) was reached, the pressure was increased to 1.4 MPa (200 psig) over a one minute span, held for one minute, decreased to zero MPa (psig) for 15 seconds (a bumping action) and then reapplied at 1.4 MPa (200 psig). A maximum curing temperature of 603K. (625° F.) was then attained and held for two hours. The panel was cooled at 2.8K. (5° F.) per minute under full pressure and removed at a temperature below 366K. (200° F.). The panel was postcured for 16 hours at 589K. (600° F.).

The laminate panels obtained were trimmed and cut into specimens for both short beam shear (SBS) and flexural strength measurements. The press-molded SBS samples were aged at a temperature of 589K. (600° F.). Each test group consisted of four SBS samples that were randomly selected and weighed as a unit before and then after aging. The flexural samples were tested but not aged.

The groups of specimens were isothermally aged at 589K. (600° F.) and removed for testing after various interval hours of exposure. The results of this when compared with the prior art are shown in the drawing Figure. Forced air ovens with an air-change rate of 75 cc/min (4.5 in$^3$min) were used. The specimen temperatures were monitored by prepositioned thermocouples and also by the separate oven controls. Mechanical testing data was obtained using an Instron Testing Machine Model TT-6, using an Instron Environmental Chamber for the elevated temperature tests flexural strength and molduli were determined according to ASTM D790. Short beam shear strengths were determined using a span to thickness ratio of four. Each specimen was held 15 minutes at test temperature prior to testing. Ultrasonic "C" scans were performed with a Nano-scope Model 414 instrument. No significant differences were detected in the mechanical strength of the present invention and that disclosed in the prior art.

EXAMPLE VI 2.00 moles of 5-norbornene-2,3-dicarboxylic ester acid (NE); 1.50 moles of benzophenonetetracarboxylic diester (BTDE); 0.34 moles of monoethyphthalate (MEP); and 2.67 moles of 4,4'-methylenedianiline (MDA); all mixed as in the previous Examples. In this Example, only the one amine is employed and the recovered liquid resin precurser system showed all of the improvements in long shelf life, good tack and drape as in the previous Examples.

SUMMARY OF THE INVENTION

The procedure used in making the prepreg and laminates of the present invention can be considered a successful technique, based on data showing that the polyimide resin can be either applied to the fibers by brush coating or immersion in a resin bath with good results. Both methods leave a flexible and tacky prepreg following evaporation of the solvent. The laminates can be either autoclave processed or molded with conventional matched metal dies.

The present invention is an important addition to the art in that it is still a low cost polyimide resin system, it is easy to fabricate, and uses a non-toxic low-boiling point solvent. The addition of the phthalic ester tackifier in the present formulation has increased the retention of tack and drape for prepreg from about two days for that disclosed in U.S. Pat. No. 4,166,170 to greater than six months for the present invention. The modified version gave laminates that had excellent strength retention and improved thermooxidative stability. This use of an ester that is liquid at room temperature is a concept that can also be used for other addition polyimide systems.

It is thus seen that the foregoing Examples are illustrative of a novel addition polyimide system based on the use of liquid monomers wherein the essentially solventless prepreg produced therefrom retains good drape, tack, and other advantageous mechanical properties.

The specific Examples described herein are to merely illustrate the invention and are not to be deemed as exhaustive. Thus, various modifications and variations of the present invention will be apparent to those skilled in the art without departing from the spirit and scope of the appended claims.

What is claimed as new and desired to be secured by Letters Patent of the United States is:

1. A method of preparing a novel addition type polyimide comprising the steps of reacting by refluxing stoichrometric amounts of benzophenonetetracarboxylic acid dianhydride, norbornene dicarboxylic acid anhydride, and phthalic anhydride in an excess of ethanol at reflux temperature and while mechanically stirred for a period of time at least exceeding that required for all monomers to go into solution, cooling the resulting solution slightly and mixing an equimolar warmed solution of mixed dianilines therewith, and cooling and storing the recovered homogeneous ester-acid/amine polyimide precursor for subsequent use as a liquid resin system.

2. The method of preparing a novel addition type polyimide as in claim 1 wherein the reflux temperature is approximately 351.4K. and after refluxing the monomer solution is cooled to 310-320K. and mixed with a solution of mixed dianilines that have been heated to approximately 310-320K.

3. The method of preparing a novel addition type polyimide as in claim 2 wherein the mixtures of dianilines consists of the isomers of methylenedianilines in the following percentages:

o,o'-MDA-3.20%
o,p'-MDA-15.70%
p,p'-MDA-66.0%

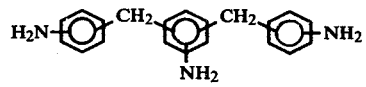

4.50% (all isomers), and

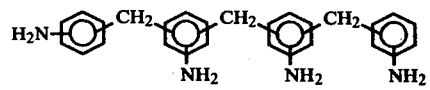

10.60% (all isomers).

4. A liquid composition of matter consisting of 1.10 moles of 5-norbornene-2,3-dicarboxylic ethyl ester acid (NE); 0.67 moles of benzophenone tetracarboxylic diethyl ester diacid (BTDE); 0.12 moles of monoethylphthalate (MEP) and 2.56 molar equivalents of a methylenedianiline mixture.

5. A liquid resin composition system consisting of 2.00 moles of 5-norbornene-2,3-dicarboxylic ethyl ester acid (NE); 1.50 moles of benzophenonetetracarboxylic diethyl ester diacid (BTDE); 0.34 moles of monoethylphthalate (MEP); and, 2.67 moles of 4,4'-methylenedianiline.

* * * * *